US012675642B2

(12) United States Patent
Mitsui

(10) Patent No.: US 12,675,642 B2
(45) Date of Patent: Jul. 7, 2026

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Toshiyuki Mitsui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/179,458

(22) Filed: Mar. 7, 2023

(65) Prior Publication Data

US 2024/0005101 A1 Jan. 4, 2024

(30) Foreign Application Priority Data

Jul. 1, 2022 (JP) ................................. 2022-107207

(51) Int. Cl.
| | |
|---|---|
| *G06F 40/35* | (2020.01) |
| *G06F 16/2452* | (2019.01) |
| *G06F 40/205* | (2020.01) |
| *G06F 40/253* | (2020.01) |
| *G06F 40/279* | (2020.01) |
| *H04L 51/02* | (2022.01) |

(52) U.S. Cl.
CPC ........ *G06F 40/35* (2020.01); *G06F 16/24522* (2019.01); *G06F 40/205* (2020.01); *G06F 40/253* (2020.01); *G06F 40/279* (2020.01); *H04L 51/02* (2013.01)

(58) Field of Classification Search
CPC .. G06F 40/35; G06F 16/24522; G06F 40/245; G06F 40/279; G06F 40/205; H04L 51/02
See application file for complete search history.

(56) References Cited

U.S. PATENT DOCUMENTS

| | | | | |
|---|---|---|---|---|
| 2009/0177959 A1* | 7/2009 | Chakrabarti | .......... | G06F 16/951 |
| | | | | 715/234 |
| 2016/0358240 A1* | 12/2016 | Redfern | ............. | G06Q 30/0619 |
| 2017/0103061 A1* | 4/2017 | Kobayashi | .............. | G06F 40/30 |
| 2019/0095523 A1* | 3/2019 | Vuskovic | ........... | G06F 16/3329 |
| 2021/0082410 A1* | 3/2021 | Teserra | .................... | G10L 15/05 |
| 2022/0238107 A1* | 7/2022 | Kim | ...................... | G06F 16/332 |
| 2023/0362107 A1* | 11/2023 | Aksar | ..................... | G06F 40/30 |

FOREIGN PATENT DOCUMENTS

| | | | | | |
|---|---|---|---|---|---|
| JP | H11-272710 A | 10/1999 | | | |
| JP | 4145776 B2 | 9/2008 | | | |
| JP | 6095487 B2 | 3/2017 | | | |
| WO | WO-2021161856 A1 * | 8/2021 | ............. | G06F 40/58 |

OTHER PUBLICATIONS

Mar. 31, 2026 Office Action issued in Japanese Patent Application No. 2022-107207.

* cited by examiner

*Primary Examiner* — Sonia L Gay

(74) *Attorney, Agent, or Firm* — Oliff PLC

(57) ABSTRACT

An information processing apparatus includes a processor configured to: parse a question to thereby specify a number of intentions included in the question and specify, from the question, one or more question intentions equal to the number; and present an answer retrieved for an individual question expressing each question intention, each answer being presented in association with the corresponding question intention.

20 Claims, 9 Drawing Sheets

FIG. 4

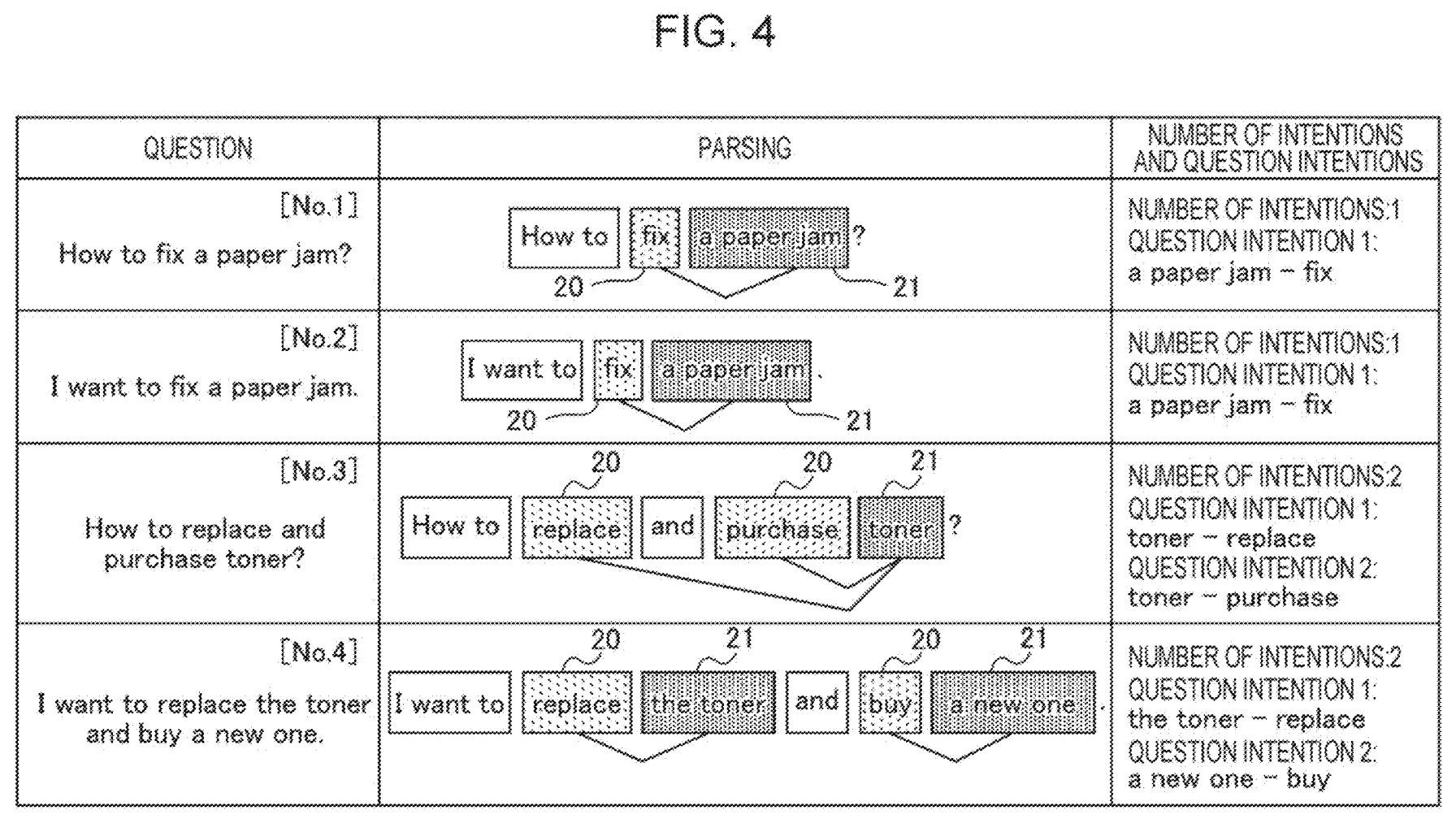

| QUESTION | PARSING | NUMBER OF INTENTIONS AND QUESTION INTENTIONS |
|---|---|---|
| [No.1]<br>How to fix a paper jam? | How to [fix] [a paper jam] ?<br>20 — 21 | NUMBER OF INTENTIONS:1<br>QUESTION INTENTION 1:<br>a paper jam → fix |
| [No.2]<br>I want to fix a paper jam. | I want to [fix] [a paper jam]<br>20 — 21 | NUMBER OF INTENTIONS:1<br>QUESTION INTENTION 1:<br>a paper jam → fix |
| [No.3]<br>How to replace and purchase toner? | How to [replace] and [purchase] [toner] ?<br>20 — 21 — 20 — 21 | NUMBER OF INTENTIONS:2<br>QUESTION INTENTION 1:<br>toner → replace<br>QUESTION INTENTION 2:<br>toner → purchase |
| [No.4]<br>I want to replace the toner and buy a new one. | I want to [replace] [the toner] and [buy] [a new one]<br>20 — 21 — 20 — 21 | NUMBER OF INTENTIONS:2<br>QUESTION INTENTION 1:<br>the toner → replace<br>QUESTION INTENTION 2:<br>a new one → buy |

FIG. 5

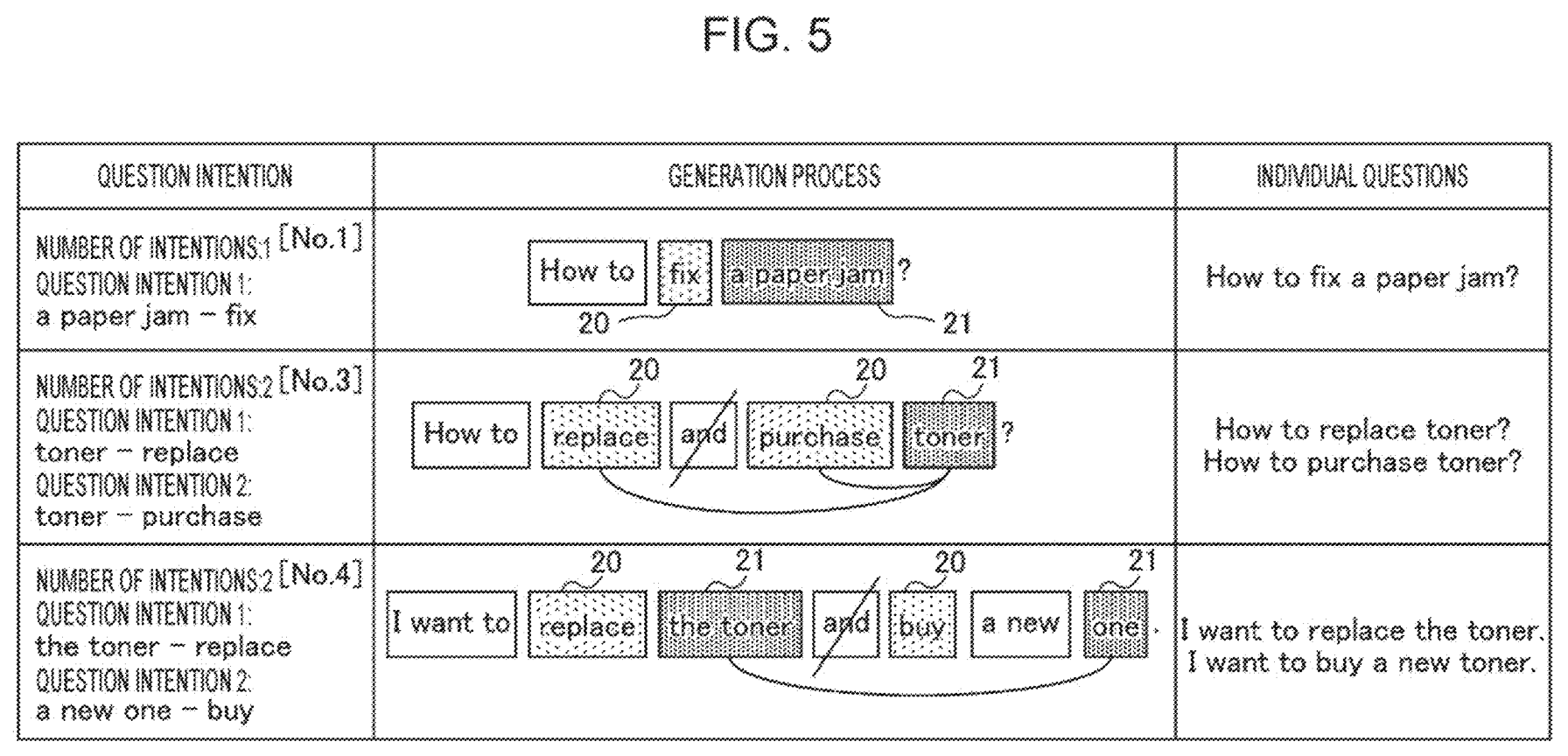

| QUESTION INTENTION | GENERATION PROCESS | INDIVIDUAL QUESTIONS |
|---|---|---|
| NUMBER OF INTENTIONS:1 [No.1] QUESTION INTENTION 1: a paper jam – fix | How to [fix] [a paper jam] ? | How to fix a paper jam? |
| NUMBER OF INTENTIONS:2 [No.3] QUESTION INTENTION 1: toner – replace QUESTION INTENTION 2: toner – purchase | How to [replace] ~~and~~ [purchase] [toner] ? | How to replace toner? How to purchase toner? |
| NUMBER OF INTENTIONS:2 [No.4] QUESTION INTENTION 1: the toner – replace QUESTION INTENTION 2: a new one – buy | I want to [replace] [the toner] ~~and~~ [buy] a new [one] . | I want to replace the toner. I want to buy a new toner. |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-107207 filed Jul. 1, 2022.

BACKGROUND

(i) Technical Field

The present disclosure relates to an information processing apparatus, an information processing method, and a non-transitory computer readable medium.

(ii) Related Art

Japanese Patent No. 4145776 discloses a question and answer apparatus that outputs an answer to an inputted question, the answer being extracted from multiple documents registered in a document database. The question and answer apparatus includes: question dividing means for dividing an inputted question into multiple divided questions, that is, questions obtained by the dividing; answer candidate storing means for retrieving search keywords from the question and the divided questions, performing a keyword search on the multiple documents, searching an answer expression database using a document ID and document score of a document obtained from the keyword search as keys, obtaining answer candidate strings, and storing pairs of the obtained answer candidate strings and the question or divided questions; answer candidate evaluating means for calculating an evaluation of the distance between the answer candidate strings stored by the answer candidate storing means and the search keyboards, and assigning to each of the pairs an evaluation score obtained as a result of the evaluation; merging means for merging pairs obtained from the divided questions and summing the evaluation scores if the answer candidate strings overlap; and answer outputting means for outputting, as an answer, a prescribed number of the answer candidates in order of the finally obtained pairs having the highest evaluation scores.

Japanese Patent No. 6095487 discloses a question and answer apparatus including: question receiving means for receiving a question; partial question extracting means for extracting a partial question which is a portion of the question; a partial question answer acquiring means for acquiring an answer to the partial question; question replacing means for replacing the section of the partial question in the question with the answer acquired by the partial question answer acquiring means; replaced question answer acquiring means for acquiring an answer to the question replaced by the question replacing means; answer outputting means for outputting an answer to the question; and a first check word list. The partial question extracting means determines whether the partial question is appropriate on the basis of whether a word on the first check word list is included in the partial question, and the partial question answer acquiring means acquires an answer to the partial question if the partial question is appropriate.

SUMMARY

As an example, a frequently asked questions (FAQ) search may be performed to find an answer to a question including multiple question intentions. In this case, unless an answer that addresses the multiple question intentions together has been prepared in the answer database of the FAQ search, an answer to the question may not be obtained, or only an answer that corresponds to one of the question intentions included in the question may be obtained.

Aspects of non-limiting embodiments of the present disclosure relate to presenting an answer for each intention included in a question that includes multiple intentions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: parse a question to thereby specify a number of intentions included in the question and specify, from the question, one or more question intentions equal to the number; and present an answer retrieved for an individual question expressing each question intention, each answer being presented in association with the corresponding question intention.

BRIEF DESCRIPTION OF THE DRAWINGS

An exemplary embodiment of the present disclosure will be described in detail based on the following figures, wherein:

FIG. 4 is a diagram illustrating an example of a specification method for specifying the number of intentions and the question intentions included in a question;

FIG. 5 is a diagram illustrating an example of a generation method for generating individual questions from a question;

FIG. 6 is a diagram illustrating a display example of answers by a chat bot with respect to a question;

FIG. 7 is a diagram illustrating a display example in which multiple answers are displayed with respect to each of question intentions included in a question;

DETAILED DESCRIPTION

Hereinafter, an exemplary embodiment of the disclosure will be described with reference to the drawings. Note that the same structural elements and the same processes are denoted with the same signs throughout all drawings, and duplicate description is omitted.

Figure 1:
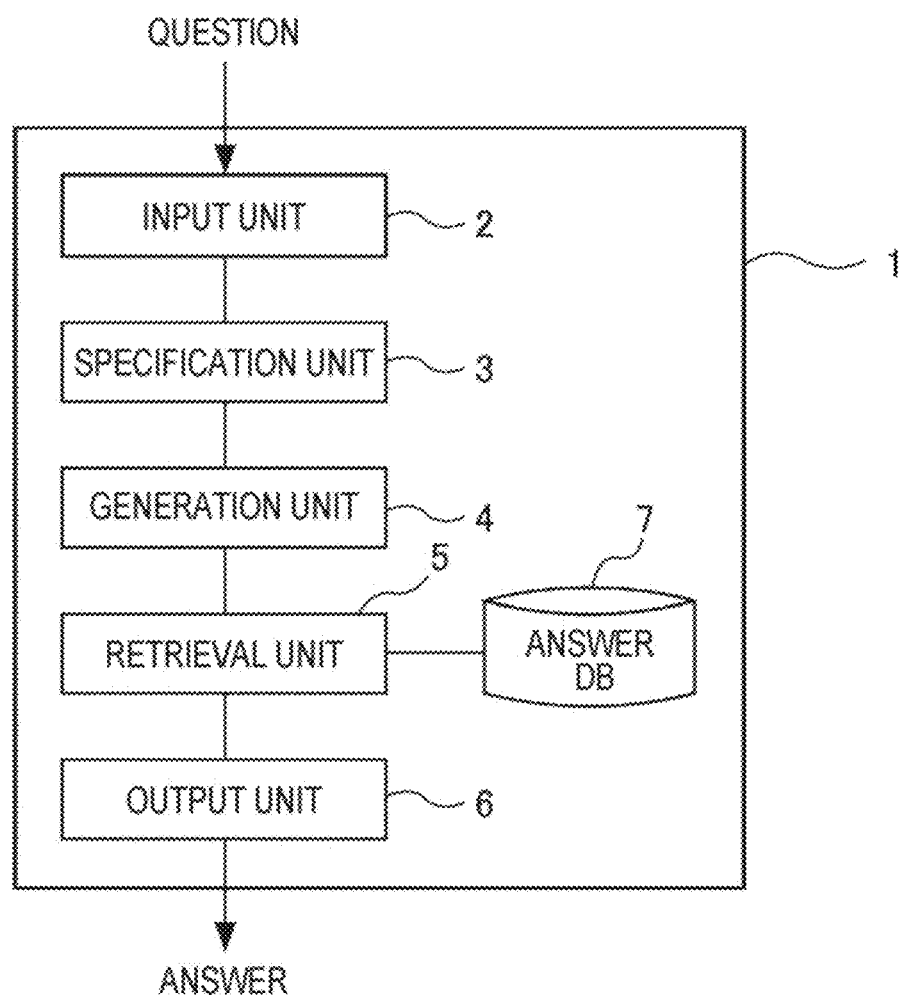
FIG. 1 is a diagram illustrating an exemplary functional configuration of an information processing apparatus.

FIG. 1 is a block diagram illustrating an exemplary functional configuration of an information processing apparatus 1 according to the exemplary embodiment. The information processing apparatus 1 accepts a question expressed in natural language as input, and outputs, in natural language, an answer to the inputted question.

The information processing apparatus 1 includes the functional units of an input unit 2, a specification unit 3, a generation unit 4, a retrieval unit 5, and an output unit 6, and an answer DB 7 serving as one example of a database (hereinafter referred to as a "DB").

The input unit 2 receives a question from a user. The question inputted into the input unit 2 does not necessarily have to be expressed as text, and a non-textual mode of expression, such as speech data or image data, for example, may also be used. In the case where speech data is inputted, the input unit 2 may, for example, convert the speech data into a question expressed as text by using a known speech recognition method such as long short-term memory (LSTM), which is one example of a recurrent neural network. In the case where image data is inputted, the input unit 2 may, for example, convert the image data into a question expressed as text by using a known image recognition method such as a residual neural network (ResNet), which is one example of a convolutional neural network.

The specification unit 3 specifies the number of intentions included in a question received by the input unit 2, and also specifies, from the question, one or more question intentions equal to the specified number. An "intention" included in a question is what the user is asking in the question, and a "question intention" is an expression of what the user is asking, using words and phrases used in the question.

The present exemplary embodiment describes a specification unit 3 that parses the question to specify the number of intentions and the question intentions included in the question. However, the method of specifying the number of intentions and question intentions described hereinafter is an example, and the specification unit 3 may use another known method (for example, a specification method using machine learning) insofar as the number of intentions and the question intentions included in the question may be specified.

The generation unit 4 generates questions expressing the question intentions by using the number of intentions and the question intentions included in the question that have been specified by the specification unit 3. Hereinafter, to distinguish between the question inputted into the input unit 2 and the questions expressing the question intentions generated by the generation unit 4, the former will be referred to as the "question" and the latter will be referred to as the "individual questions". The individual questions are the question intentions converted into natural language understandable to humans. That is, the individual questions are alternative expressions of the question intentions, and therefore are also an example of the question intentions.

The present exemplary embodiment describes a rule-based generation unit 4 that generates individual questions expressing the question intentions from a question according to predetermined rules. However, this is an example, and the generation unit 4 may use another known method (for example, a specification method using machine learning) insofar as individual questions expressing the question intentions may be generated from the question.

The retrieval unit 5 retrieves an answer to an individual question generated by the generation unit 4. Obviously, if there are multiple individual questions generated by the generation unit 4, the retrieval unit 5 retrieves an answer for each individual question.

The answer DB 7 is a database in which answers to a variety of individual questions are stored in advance. The retrieval unit 5 retrieves answers to individual questions from the answer DB 7. Note that there are no restrictions on the method of retrieving answers in the retrieval unit 5, and a known retrieval method such as keyword search or natural language search may be used, for example.

The output unit 6 outputs the answer retrieved for each individual question by the retrieval unit 5 in association with each individual question, and presents the user with an answer to the question.

Presenting the user with an answer to the question refers to rendering the answer to the question in a state that the user is able to recognize. Consequently, the output unit 6 may output the answer to the question in any form that would be recognizable to the user. For example, the output unit 6 may display the answer to the question on a display unit 19 described later (see FIG. 2) or transmit the answer to the question through a communication unit described later (see FIG. 2) to an external apparatus, not illustrated, that is connected to a communication channel. Moreover, the output unit 6 may use an image forming apparatus such as a printer, not illustrated, to print the answer to the question onto paper. Hereinafter, an example in which the output unit 6 displays the answer to the question on the display unit 19 will be described.

Note that the answer DB 7 does not necessarily have to be provided in the information processing apparatus 1, and the answer DB 7 may also be provided in an external apparatus, for example. In this case, the information processing apparatus 1 may simply connect to the external apparatus through the communication unit 17 described later and retrieve answers to the individual questions.

Figure 2:
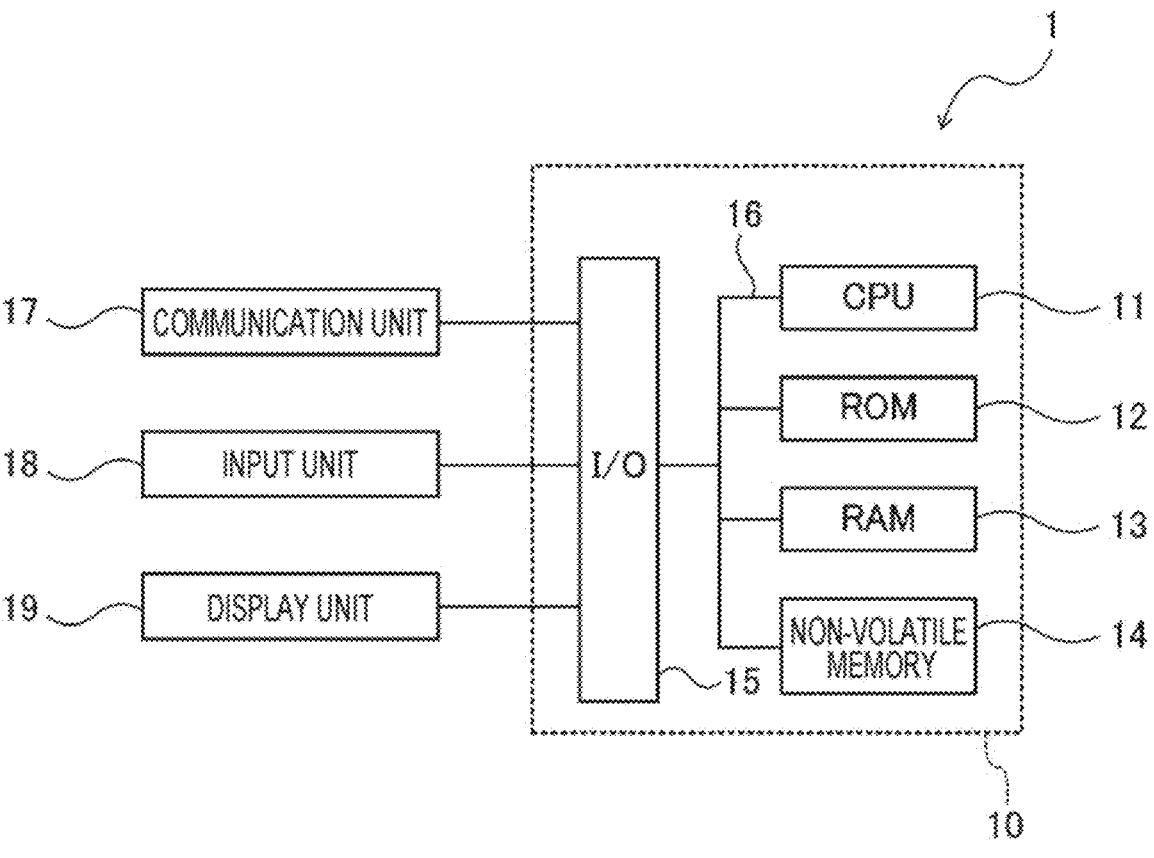
FIG. 2 is a diagram illustrating an exemplary schematic configuration of an electrical system of the information processing apparatus.

The information processing apparatus 1 illustrated in FIG. 1 may be configured using a computer 10. FIG. 2 is a diagram illustrating an exemplary schematic configuration of an electrical system of the information processing apparatus 1 configured using the computer 10.

The computer 10 is provided with a central processing unit (CPU) 11 serving as one example of a processor responsible for executing each function unit of the information processing apparatus 1 illustrated in FIG. 1, read-only memory (ROM) 12 storing a boot program (basic input/output system (BIOS)) that performs a process of booting the computer 10, random access memory (RAM) 13 used as a temporary work area of the CPU 11, non-volatile memory 14, and an input-output interface (I/O) 15. The CPU 11, ROM 12, RAM 13, non-volatile memory 14, and I/O 15 are interconnected through a bus 16.

The non-volatile memory 14 is one example of a storage device that retains stored information even if electric power supplied to the non-volatile memory 14 is cut off; semiconductor memory is used for example, but a hard disk may also be used. Accordingly, the non-volatile memory 14 stores an information processing program that causes the computer 10 to function as the information processing apparatus 1, for example. In addition, information to be retained in storage even if the power supply to the information processing apparatus 1 is cut off, such as the answer DB 7, is stored in the non-volatile memory 14.

A communication unit 17, an input unit 18, and a display unit 19, for example, are connected to the I/O 15.

The communication unit 17 is connected to a communication channel and is provided with a communication protocol used to perform data communication with an external apparatus through the communication channel.

The input unit 18 is one example of a unit that accepts operating content from the user with respect to the information processing apparatus 1 and notifies the CPU 11, and includes buttons, a touch panel, a keyboard, a mouse, a pointing device, and/or the like.

The display unit 19 is one example of a unit that visually displays information processed by the CPU 11, and includes a liquid crystal display (LCD) panel, an organic light-emitting diode (OLED) panel, and/or the like.

Note that in the case where the information processing apparatus 1 is operated remotely from an external apparatus, the information processing apparatus 1 receives operating content from the user through the communication unit 17 and transmits information processed by the information processing apparatus 1 to the external apparatus through the communication unit 17. Accordingly, the input unit 18 and the display unit 19 do not necessarily have to be connected to the I/O 15.

Next, an answer retrieval process executed by the information processing apparatus 1 will be described.

Figure 3:
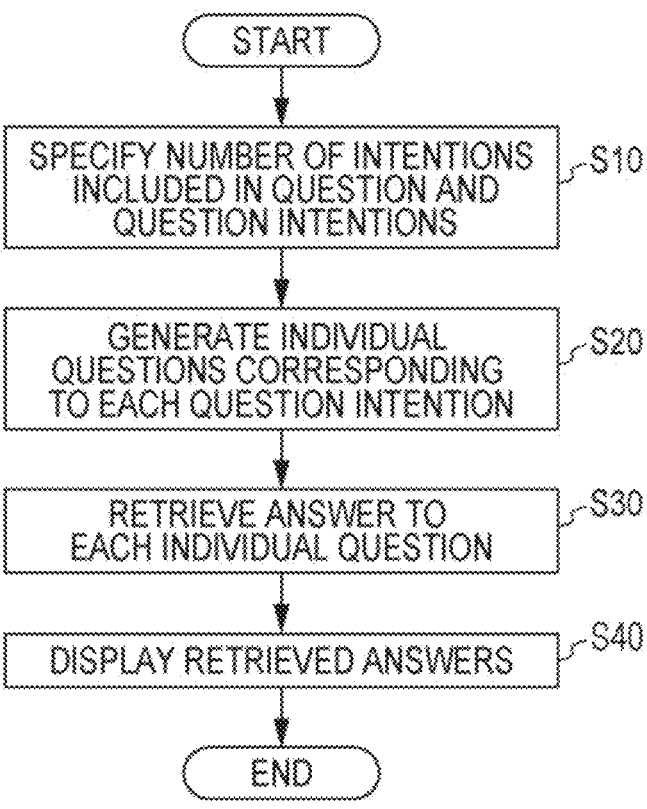
FIG. 3 is a flowchart illustrating an example of the flow of an answer retrieval process.

FIG. 3 is a flowchart illustrating an example of a flow of the answer retrieval process executed by the CPU 11 of the information processing apparatus 1 when a question is received from the user.

An information processing program defining the answer retrieval process is stored in advance in the non-volatile memory 14 of the information processing apparatus 1, for example. The CPU 11 of the information processing apparatus 1 loads the information processing program stored in the non-volatile memory 14, and executes the answer retrieval process.

In step S10, the CPU 11 specifies the number of intentions included in the received question and also specifies, from the question, one or more question intentions equal to the specified number.

FIG. 4 is a diagram illustrating an example of a specification method for parsing a question and specifying the number of intentions and the question intentions included in the question.

First, the CPU 11 specifies a verb of the question. The CPU 11 determines whether the specified verb serves as the predicate of the question. If the specified verb serves as the predicate of the question, the CPU 11 specifies that the expression expressed by the verb serving as the predicate and the object of the verb serving as the predicate, that is, the combination of the verb serving as the predicate and the object of the verb serving as the predicate, expresses an intention included in the question. In other words, number of intentions included in a question is denoted by the number of combinations, obtained from the question, of a verb serving as the predicate and the object of the verb serving as the predicate. A combination of a verb serving as the predicate and the object of the verb serving as the predicate is an expression of what the user is asking using words and phrases used in the question, and therefore expresses a question intention of the user in the question.

If the CPU 11 parses the question "How to fix a paper jam?" in [No. 1] of FIG. 4, the combination of the verb "fix" serving as the predicate and the object "a paper jam" of "fix" is detected. Accordingly, the CPU 11 specifies "1" as the number of intentions included in the question and specifies "a paper jam—fix" as a question intention in the question. Note that "—" in the question intention is a symbol denoting the combination of a verb and an object. Also, the frame 20 in FIG. 4 denotes the word or phrase serving as the verb in the question intention, and the frame 21 denotes the word or phrase serving as the object of the verb in the question intention.

If the CPU 11 parses the question "I want to fix a paper jam." in [No. 2] of FIG. 4, "want to" is detected as the verb serving as the predicate of the question. However, "want to" merely expresses a desire of the user, such as the user simply wanting something, without expressing specifically what the user wants to do, and is insufficient for specifying the intention of the user. Accordingly, the CPU 11 focuses on the object of the verb serving as the predicate of the question, and if the verb serving as the predicate of the question takes another verb as its object, the expression expressed by the other verb and the object that the other verb takes is specified as an intention included in the question.

That is, in the case of the question in [No. 2] of FIG. 4, since "want to" takes the verb "fix" as its object, the CPU 11 detects the combination of "fix" and the object "a paper jam" of "fix". Accordingly, the CPU 11 specifies "1" as the number of intentions included in the question and specifies "a paper jam—fix" as a question intention in the question.

If the CPU 11 parses the question "How to replace and purchase toner?" in [No. 3] of FIG. 4, the two verbs "replace" and "purchase" are detected as verbs serving as the predicate. Since the object is "toner" for both of the verbs, the CPU 11 specifies "2" as the number of intentions included in the question, and specifies each of "toner—replace" and "toner-purchase" as question intentions in the question.

If the CPU 11 parses the question "I want to replace the toner and buy a new one." in [No. 4] of FIG. 4, the two verbs "replace" and "buy" are detected as verbs serving as the predicate. Since the object of "replace" is "the toner" and the object of "buy" is "a new one", the CPU 11 specifies "2" as the number of intentions included in the question, and specifies each of "toner—replace" and "a new one—buy" as question intentions in the question.

In step S20 of FIG. 3, the CPU 11 uses the number of intentions and the question intentions included in the question that were specified in step S10 to generate one or more individual questions equal to the number of intentions, each individual question expressing one of the question intentions.

FIG. 5 is a diagram illustrating an example of a generation method for generating individual questions using the number of intentions and question intentions included in a question.

First, the CPU 11 references the number of intentions included in the question. If the number of intentions is 1, the CPU 11 generates the received question itself as an individual question.

The question intention [No. 1] in FIG. 5 is the question intention specified from the question [No. 1] "How to fix a paper jam?" in FIG. 4. Since the number of intentions included in the question in [No. 1] of FIG. 4 is 1, the CPU 11 generates the question "How to fix a paper jam?" itself as an individual question. Accordingly, since the number of intentions included in the question is also 1 for the question "I want to fix a paper jam." in [No. 2] of FIG. 4, the CPU 11 generates the question itself as an individual question.

On the other hand, if the question includes a plural number of intentions, the CPU 11 generates an individual question for each intention in the question by extracting, from the question, the object included in the question intention, any modifiers of the object, the verb included in the question intention, and any modifiers of the verb. Specifically, to make the individual questions be natural language understandable to humans, the CPU 11 generates each individual question by arranging the word or phrase up to the occurrence of the first verb in the question, the verb included in the question intention and any modifiers of the verb, and the object included in the question intention and any modifiers of the object.

The question intentions [No. 3] in FIG. 5 are the question intentions specified from the question "How to replace and purchase toner?" in [No. 3] of FIG. 4. Note that the "I" symbol in the generation process field denotes a phrasal division.

Since the number of intentions included in the question in [No. 3] of FIG. 4 is 2, the CPU 11 extracts, from the question, the object "toner" included in the first question intention "toner—replace", any modifiers of "toner", the verb "replace" included in the first question intention, and any modifiers of "replace". In the example of the question in [No. 3] of FIG. 4, no modifiers exist for "toner" or "replace", and therefore no modifiers are extracted from the question for either one. Also, in the question in [No. 3] of FIG. 4, since the verb that occurs first is "replace", the word or phrase up to the occurrence of the first verb in the question is "How to". Accordingly, the CPU 11 generates the individual question "How to replace toner?" with respect to the first question intention.

Next, the CPU 11 extracts, from the question, the object "toner" included in the second question intention "toner—purchase", any modifiers of "toner", the verb "purchase" included in the second question intention, and any modifiers of "purchase". In the example of the question in [No. 3] of FIG. 4, no modifiers exist for "toner" or "purchase", and therefore no modifiers are extracted from the question for either one. Also, since the word or phrase up to the occurrence of the first verb in the question is "How to", the CPU 11 generates the individual question "How to purchase toner?" with respect to the second question intention.

Also, the question intentions [No. 4] in FIG. 5 are the question intentions specified from the question "I want to replace the toner and buy a new one." in [No. 4] of FIG. 4.

Since the number of intentions included in the question in [No. 4] of FIG. 4 is 2, the CPU 11 extracts, from the question, the object "the toner" included in the first question intention "the toner—replace", any modifiers of "the toner", the verb "replace" included in the first question intention, and any modifiers of "replace". In the example of the question in [No. 4] of FIG. 4, no modifiers exist for "the toner" or "replace", and therefore no modifiers are extracted from the question for either one. Also, in the question in [No. 4] of FIG. 4, since the verb that occurs first is "replace", the word or phrase up to the occurrence of the first verb in the question is "I want to". Accordingly, the CPU 11 generates the individual question "I want to replace the toner." with respect to the first question intention.

Next, the CPU 11 extracts, from the question, the object "a new one" included in the second question intention "a new one—buy", any modifiers of "a new one", the verb "buy" included in the second question intention, and any modifiers of "buy". Note that in the case where a demonstrative pronoun is included in the object, the CPU 11 replaces the demonstrative pronoun with the word or phrase that the demonstrative pronoun is referring to. In the example of the question in [No. 4] of FIG. 4, "one" is referring to "toner", and thus "a new one" is replaced with "a new toner". Also, in the example of the question in [No. 4] of FIG. 4, no modifiers exist for "a new one" or "buy", and therefore no modifiers are extracted from the question for either one. Also, since the word or phrase up to the occurrence of the first verb in the question is "I want to", the CPU 11 generates the individual question "I want to buy a new toner." with respect to the second question intention.

If individual questions are generated in this way, in step S30 of FIG. 3, the CPU 11 retrieves, for each individual question, an answer to the individual question from the answer DB 7. the CPU 11 may use the search function of a portal site, for example, to retrieve answers to individual questions from various DB s made public on the Internet.

In step S40, the CPU 11 displays, on the display unit 19, the answers retrieved in step S30 in association with each of the individual questions. In this case, the CPU 11 may display only each individual question and answer on the display unit 19, but the question is displayed together with the answer to each individual question in a way that demonstrates which part of the question corresponds to each question intention.

Figure 6:
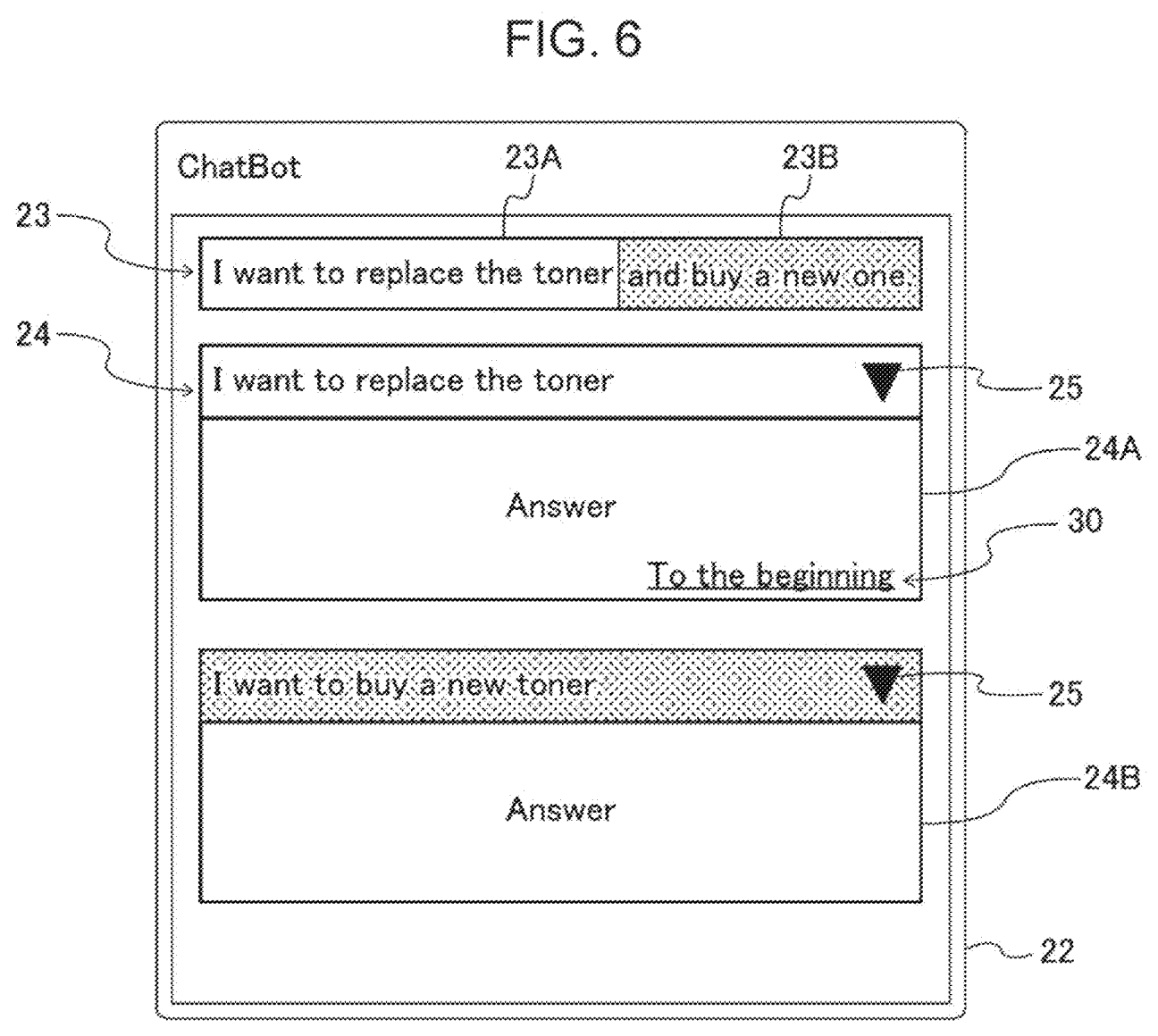

FIG. 6 is a diagram illustrating a display example of answers in the case where, for example, the information processing apparatus 1 functions as a chat bot that answers a question from the user received via chat.

A dialog 22 displaying individual questions and answers includes a question display area 23 and an answer display area 24.

In the question display area 23, the CPU 11 displays the question received from the user. Also, in the answer display area 24, the CPU 11 displays, for each individual question generated from the question, the individual question in association with the answer.

Accordingly, in the case where a question includes multiple question intentions, individual questions expressing the multiple question intentions and the corresponding answers are displayed in the answer display area 24. In this case, the CPU 11 displays the dialog 22 in which the part of the question from which an individual question has been generated is associated with the individual question in a way that demonstrates which individual question has been generated by focusing on which part of the question. That is, the CPU 11 displays the dialog 22 in which the part of the question from which an individual question has been generated is associated with the individual question in a way that demonstrates the association between each part corresponding to a question intention in the question and each area where the answer to the individual question expressing the question intention is presented.

As an example, a case will be described in which the CPU 11 receives "I want to replace the toner and buy a new one." indicated in [No. 4] of FIG. 4 as the question from the user. In this case, the question "I want to replace the toner and buy a new one." received from the user is displayed as-is in the question display area 23 of the dialog 22 illustrated in FIG. 6.

Since the question indicated in [No. 4] of FIG. 4 includes the two question intentions of "the toner—replace" and "a new one—buy", the CPU 11 divides the question display area 23 for displaying the question into two question display areas 23A and 23B, being an area for displaying the part "I want to replace the toner" that corresponds to the first question intention and an area for displaying the part "and buy a new one." that corresponds to the second question intention.

Furthermore, the CPU 11 displays the individual question, that is, "I want to replace the toner.", expressing the question intention "the toner—replace" of the user included in the question display area 23A and its answer in an answer display area 24A provided inside the answer display area 24.

The CPU 11 also displays the individual question, that is, "I want to buy a new toner.", expressing the question intention "a new one—buy" of the user included in the question display area 23B and its answer in an answer display area 24B provided inside the answer display area 24.

In this case, the CPU 11 displays the background color of the question display area 23A and the background color of the individual question in the answer display area 24A in the same color, for example. On the other hand, the CPU 11 displays the background color of the question display area 23B and the background color of the individual question in the answer display area 24B in the same color which is different from the color of the question display area 23A. With this arrangement, the user can grasp the association between each part corresponding to a question intention in the question and each area where the answer to the individual question expressing the question intention is presented.

Note that the association between each part corresponding to a question intention in the question and each area where the answer to the individual question expressing the question intention is presented may also be presented according to a method other than differences in the background colors of the question display area 23 and the answer display area 24. For example, at least one of the text color, text size, font face, and text decoration of an individual question and the part of the question corresponding to the question intention expressed by the individual question may be changed for each combination of each question intention included in the question and the corresponding individual question. Text decoration refers to keeping the text color, text size, and font face the same while altering the look of the text by adding an underline or emphasis marks and changing the text weight, for example.

Also, the CPU 11 may not display an individual question and answer on the dialog 22 from the beginning, and if a part corresponding to a question intention in the question is selected using the mouse or the like, the CPU 11 may display, on the display unit 19, the individual question expressing the selected question intention and its answer. That is, the CPU 11 may make the association between each part corresponding to a question intention in the question and each area where the answer to the individual question expressing the question intention is presented by embedding, into the part corresponding to a question intention in the question, reference information (also referred to as a "hyperlink") referencing the individual question expressing the question intention and its answer.

Note that in the example of the answer display area 24 illustrated in FIG. 6, the individual questions are displayed at the beginning, but the individual questions do not necessarily have to be displayed in the answer display area 24 insofar as there is a demonstrated association between each part corresponding to a question intention in the question and each answer to the individual question expressing the question intention.

Also, if the answer retrieved by the CPU 11 is managed in the form of a FAQ format of question and answer pairs, the CPU 11 may display, in the answer display area 24, a question (hereinafter referred to as the "question title") pre-associated with the retrieved answer instead of the individual question.

The CPU 11 may also display an expand/collapse button 25, which is one example of a display aid item, for each individual question in the answer display area 24. If the expand/collapse button 25 is selected using the mouse or the like, the CPU 11 hides the answer to the individual question for which the expand/collapse button 25 is selected. This arrangement allows for a shortening of the display range in the vertical direction of the dialog 22 compared to the case in which the answers to each of the individual questions are all displayed in the dialog 22, thereby reducing the amount of scrolling it takes to check each of the individual questions. Note that if the expand/collapse button 25 is selected while the answer to an individual question is in the hidden state, the CPU 11 displays the answer to the individual question for which the expand/collapse button 25 is selected.

The CPU 11 may also display a jump link 30, which is one example of a display aid item, at the end of an answer displayed in the answer display area 24. The jump link 30 is one example of a hyperlink, and if a character string such as "To the beginning" associated with the jump link 30, for example, is selected using the mouse or the like, the CPU 11 controls the display unit 19 such that the beginning of the answer that had been displayed together with the selected jump link 30 is displayed in the dialog 22. If the answer displayed in the answer display area 24 is lengthy, the user may have to scroll to view the answer, and if the user wants to return to the beginning of the answer being viewed, the user itself would have to scroll back to the beginning of the answer being viewed. However, if the jump link 30 is provided in the answer display area 24, the user is able to jump to the beginning of the answer simply by selecting the jump link 30 with the mouse or the like, thereby reducing the amount of scrolling it takes to display the beginning of the answer compared to the case in which the jump link 30 is not displayed in the answer display area 24.

As an example, the description herein describes the jump link 30 that jumps to the position where the individual question is displayed, but there are no restrictions on the destination when the jump link 30 is selected, and it is also possible to jump to the display position of the question in the question display area 23, for example.

Also, an example is described in which, in the dialog 22 illustrated in FIG. 6, one answer is displayed with respect to each of the question intentions included in the question, but multiple answers may also be displayed with respect to each of the question intentions.

Figure 7:
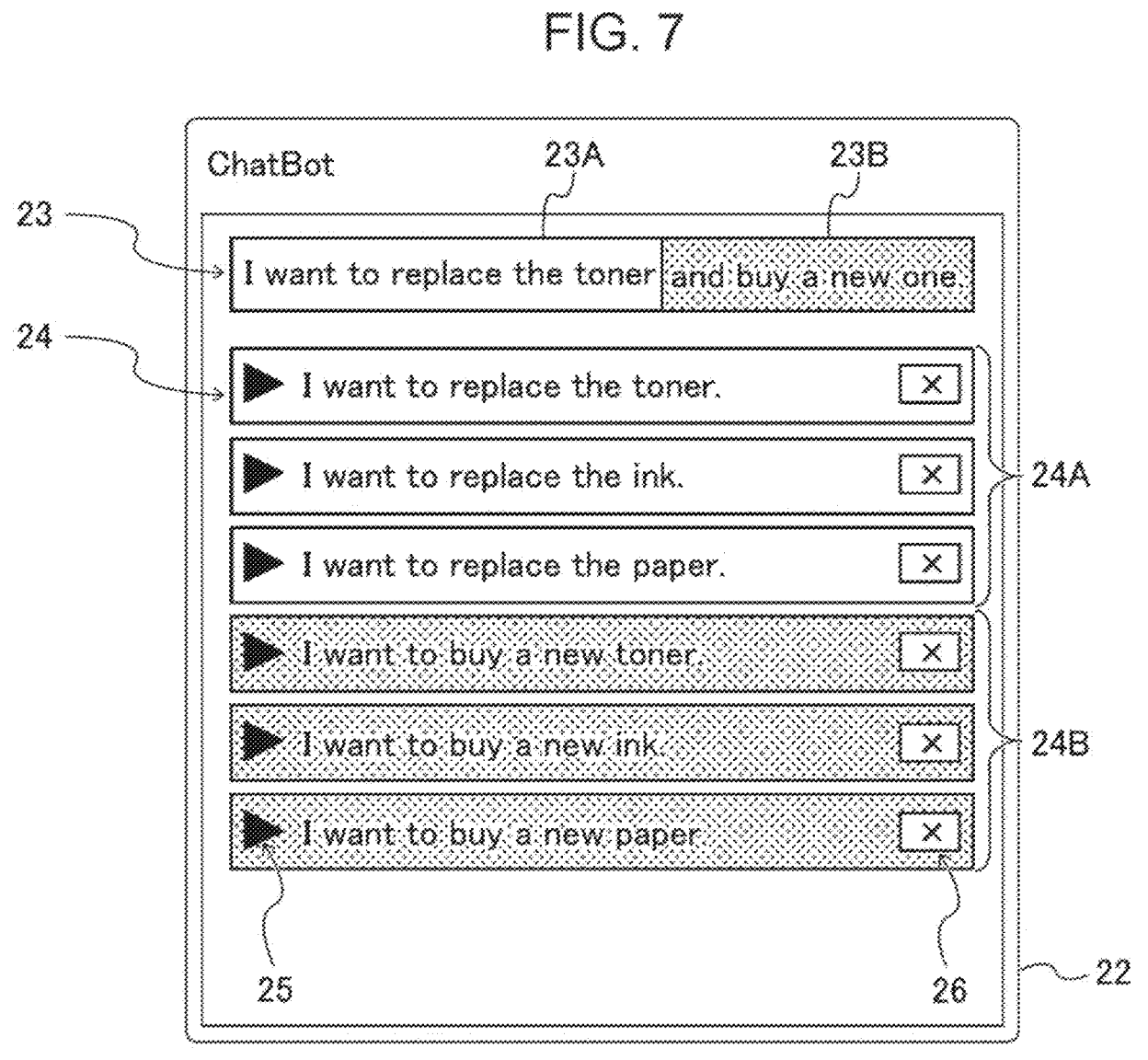

FIG. 7 is a diagram illustrating an example of the dialog 22 in which multiple answers are displayed with respect to each of question intentions included in a question.

For example, if multiple answers managed together with question titles in the form of a FAQ format are retrieved with respect to individual questions in step S30 of FIG. 3, the CPU 11 may display the question title of each retrieved answer in the answer display area 24. In this case, too, the background color of the question display area 23 and the background color of the question titles are associated to demonstrate, for each question intention included in the question, the association between each part corresponding to the question intention in the question and the answer display area 24 for the question intention.

As illustrated in FIG. 7, the CPU 11 may also display a remove button 26, which is one example of a display aid item, for each of the question titles. If the remove button 26 is selected using the mouse or the like, the CPU 11 causes the corresponding question title to be removed and not displayed in the dialog 22. With this arrangement, the user is able to leave, in the dialog 22, only the question titles thought to be relevant to the question that the user is asking from among the question titles presented by the chat bot.

The method of presenting answers to a question according to the present exemplary embodiment may be applied not only to a chat bot, but also to an enterprise content management (ECM) system that enables the cross-searching of data without being aware of where the data is stored, enterprise search (ES), and a FAQ search system that manages frequently asked questions in association with answers.

In ECM, ES, and FAQ search systems, answers to a question may not only be displayed in a limited area like the dialog 22 as with the chat bot, but may also be displayed on a web screen 27 displayed over the entire display area of the display unit 19. On such a web screen 27, the CPU 11 may display answer display areas 24 in a vertically adjacent layout or in a tabbed layout.

Figure 8:
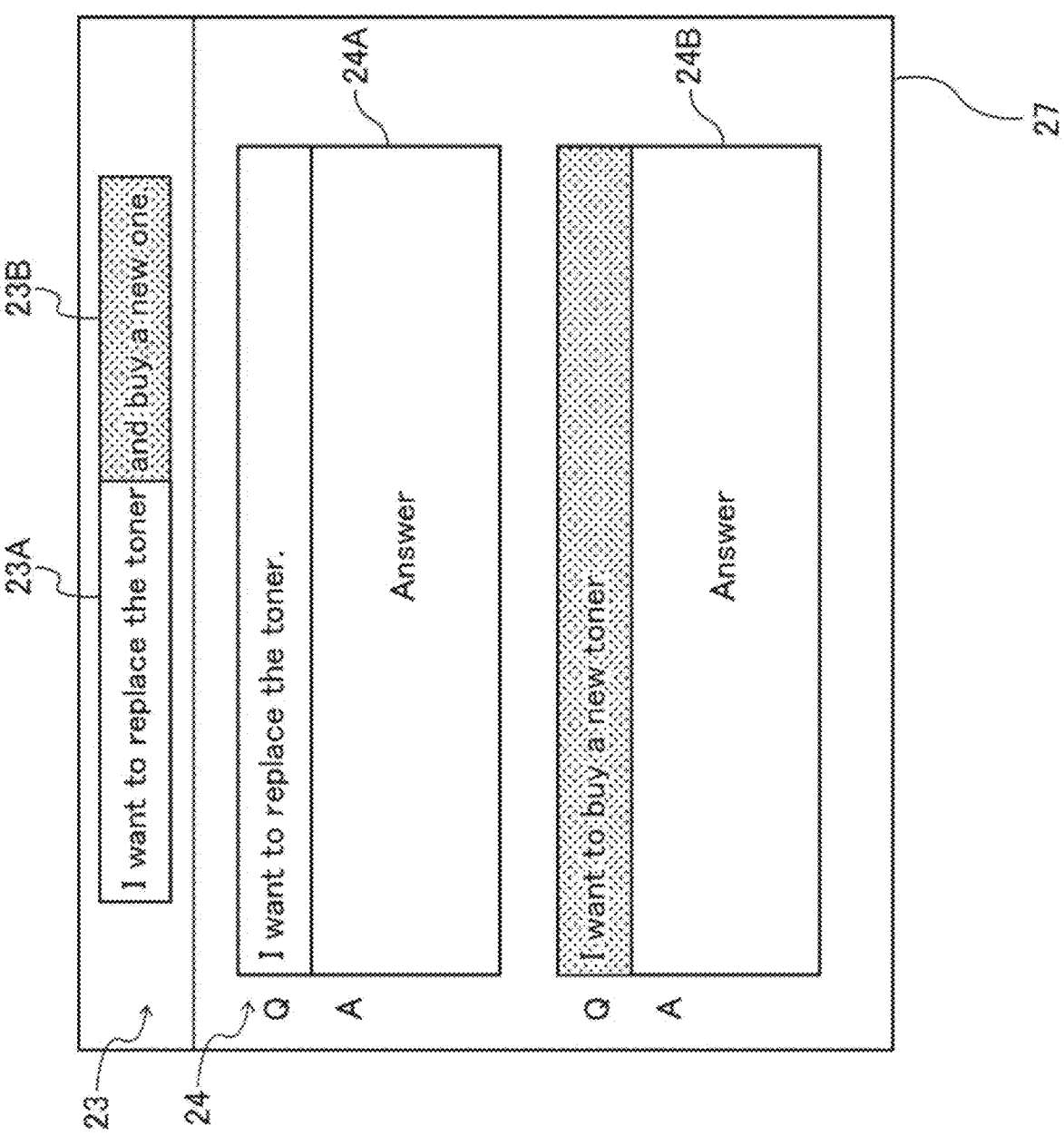
FIG. 8 is a diagram illustrating a display example in which answer display areas are displayed in a vertically adjacent layout with respect to a question.
Figure 9:
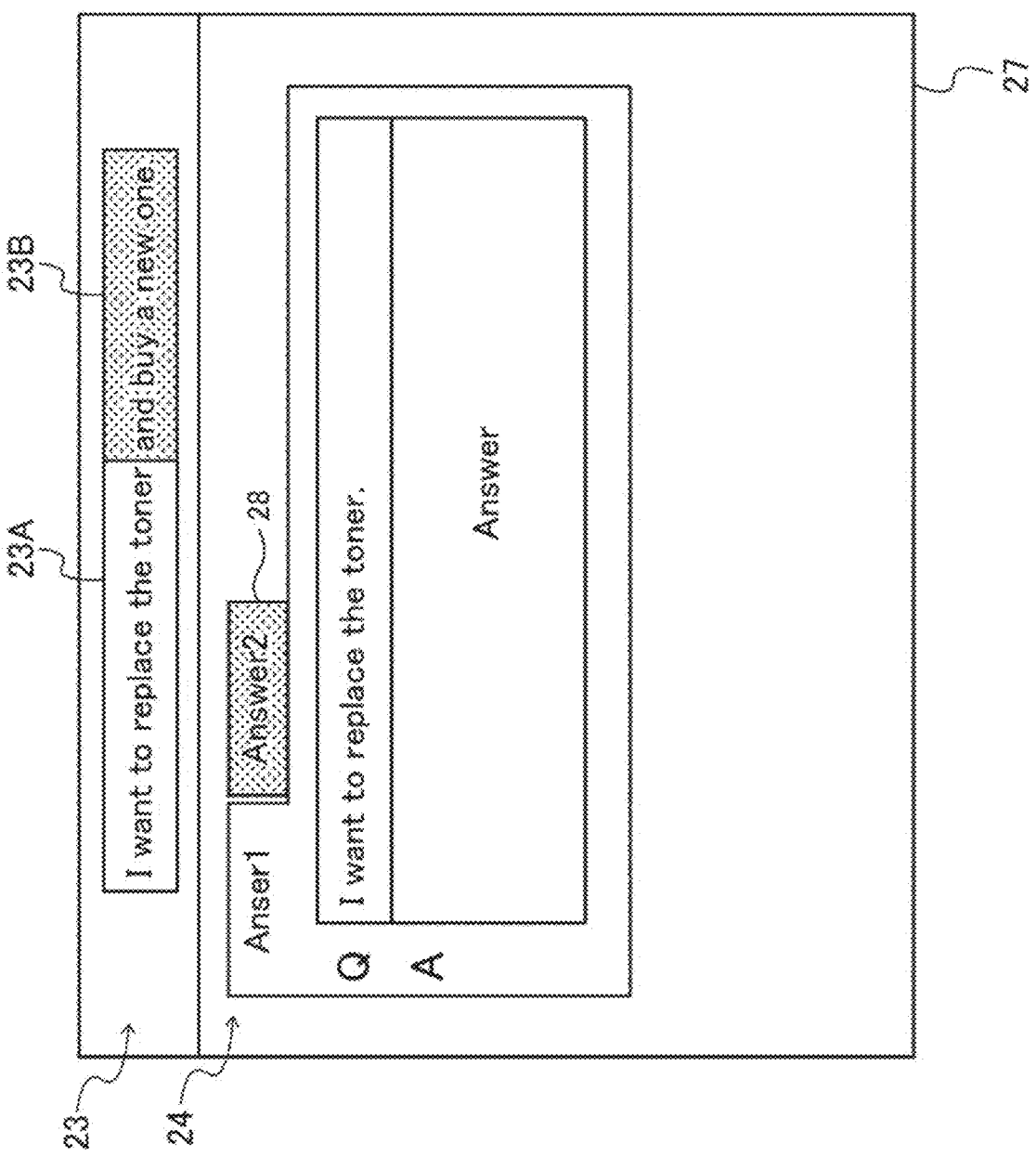
FIG. 9 is a diagram illustrating a display example in which answer display areas are displayed in a tabbed layout with respect to a question.

FIGS. 8 and 9 are diagrams illustrating display examples in which answers to a question are displayed on the web screen 27 in association with each of individual questions generated from the question. In the display example illustrated in FIG. 8, the answer display areas 24 are displayed in a vertically adjacent layout, whereas in the display example illustrated in FIG. 9, each of the answer display areas 24 is displayed by switching tabs 28.

In this way, there are no restrictions on the display layout of the question display area 23 and the answer display areas 24 on the display unit 19, but in the display examples illustrated in FIGS. 8 and 9, too, the CPU 11 presents a display that demonstrates the association between each part corresponding to a question intention in the question and the answer display area 24 for the question intention.

The description thus far describes an example in which a question is given in English and one or more question intentions included in the question are specified to generate one or more individual questions, but the answer retrieval process illustrated in FIG. 3 may also be applied to present answers to questions in languages other than English, such as Japanese, for example.

The above uses an exemplary embodiment to describe an embodiment of the information processing apparatus 1, but the disclosed embodiment of the information processing apparatus 1 is an example, and other aspects of the information processing apparatus 1 are not limited to the scope described in the exemplary embodiment. Various modifications or alterations may be made to the exemplary embodiment within a scope that does not depart from the gist of the present disclosure, and any embodiments obtained by such modifications or alterations are also included in the technical scope of the present disclosure. For example, the display layout of answers to a question illustrated in FIGS. 6 to 9 may be changed within a scope that does not depart from the gist of the present disclosure.

Also, the exemplary embodiment above describes an embodiment in which the answer retrieval process is achieved in software as an example. However, processing that is substantially the same as the flowchart of the answer retrieval process illustrated in FIG. 3 may also be configured to be executed in hardware. In this case, a speedup of the processing may be attained compared to the case in which the answer retrieval process is achieved in software.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The exemplary embodiment above describes an example in which the information processing program is stored in the non-volatile memory 14, but the storage location of the information processing program is not limited to the non-volatile memory 14. The information processing program according to the present disclosure may also be provided by being recorded on a storage medium readable by the computer 10. For example, the information processing program may be provided by being recorded onto an optical disc such as Compact Disc Read-Only Memory (CD-ROM) or Digital Versatile Disc Read-Only Memory (DVD-ROM). Also, the information processing program may be provided by being recorded on a portable semiconductor memory such as Universal Serial Bus (USB) memory or a memory card. The ROM 12, non-volatile memory 14, CD-ROM, DVD-ROM, USB, and memory card are examples of a non-transitory storage medium.

Furthermore, the information processing apparatus 1 may also download the information processing program from an external apparatus through a communication channel and store the downloaded information processing program in a storage device. In this case, the CPU 11 of the information processing apparatus 1 executes each of the processes by loading, from the storage device, the information processing program that has been downloaded from the external apparatus.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising a processor configured to:

parse a question to thereby specify a number of intentions included in the question and specify, from the question, one or more question intentions equal to the number; and present an answer retrieved for an individual question expressing each question intention, each answer being presented in association with the corresponding question intention.

(((2)))

The information processing apparatus according to (((1))), wherein the processor is configured to specify, as one intention, an expression expressed by a verb serving as a predicate of the question and an object of the verb serving as the predicate.

(((3)))

The information processing apparatus according to (((2))), wherein if a verb serving as the predicate does not exist in the question and the question ends in a noun, the processor is configured to specify an intention of the question by adding, to the end of the sentence, a predetermined verb to serve as the predicate.

(((4)))

The information processing apparatus according to (((2))), wherein if the question ends in a verb stem, the processor is configured to specify an intention of the question by adding, to the end of the sentence, an auxiliary verb expressing desire.

(((5)))

The information processing apparatus according to (((1))), wherein if a verb serving as a predicate of the question takes another verb as an object, the processor is configured to specify, as one intention, an expression expressed by the other verb and an object that the other verb takes.

(((6)))

The information processing apparatus according to any one of (((1))) to (((5))), wherein if the question includes a plural number of intentions, the processor is configured to generate the individual questions expressing the question intentions in the question by extracting, from the question and for each intention in the question, an object included in the question intention, any modifiers of the object, a verb included in the question intention, and any modifiers of the verb.

(((7)))

The information processing apparatus according to any one of (((1))) to (((6))), wherein the processor is configured to present the answer to the individual question expressing each question intention together with the question displayed in a way that demonstrates which part of the question corresponds to each question intention.

(((8)))

The information processing apparatus according to (((7))), wherein the processor is configured to present the question and the answer to the individual question expressing each question intention in a way that demonstrates the association between each part corresponding to the question intention in the question and each area where the answer to the individual question expressing the question intention is presented.

(((9)))

An information processing program causing a computer to execute a process comprising:

parse a question to thereby specify a number of intentions included in the question and specify, from the question, one or more question intentions equal to the number; and present an answer retrieved for an individual question expressing each question intention, each answer being presented in association with the corresponding question intention.

What is claimed is:

1. An information processing apparatus comprising:

a processor configured to:

parse a question and, based on the parsing, specify a number of one or more intentions included in the question, the number being a numerical integer value;

generate, from the question, one or more individual queries each corresponding to a respective one of the one or more intentions;

divide a display region into a number of one or more display areas corresponding to the number of the one or more intentions; and present, in each display area, (i) the individual query corresponding to the respective intention and (ii) an answer retrieved for the individual query.

2. The information processing apparatus according to claim 1, wherein the processor is configured to specify, as one intention, an expression expressed by a verb serving as a predicate of the question and an object of the verb serving as the predicate.

3. The information processing apparatus according to claim 2, wherein if a verb serving as the predicate does not exist in the question and the question ends in a noun, the processor is configured to specify an intention of the question by adding, after the noun, a predetermined verb to serve as the predicate.

4. The information processing apparatus according to claim 2, wherein if the question ends in a verb stem, the processor is configured to specify an intention of the question by adding, after the verb stem, an auxiliary verb expressing desire.

5. The information processing apparatus according to claim 1, wherein if a verb serving as a predicate of the question takes another verb as an object, the processor is configured to specify, as one intention, an expression expressed by the other verb and an object that the other verb takes.

6. The information processing apparatus according to claim 1, wherein if the number of the one or more intentions is two or higher, the processor is configured to generate the individual queries corresponding to the intentions by extracting, from the question and for each intention, an object included in the respective intention, any modifiers of the object, a verb included in the respective intention, and any modifiers of the verb.

7. The information processing apparatus according to claim 1, wherein the processor is configured to present, in each display area, (i) the individual query corresponding to the respective intention in a way that demonstrates which part of the question corresponds to the respective intention, (ii) the answer retrieved for the individual query, and (iii) an expand/collapse button which, when selected, causes the processor to display or hide the answer while the individual query is continuously displayed in the respective display area.

8. The information processing apparatus according to claim 2, wherein the processor is configured to present, in each display area, (i) the individual query corresponding to the respective intention in a way that demonstrates which part of the question corresponds to the respective intention, (ii) the answer retrieved for the individual query, and (iii) an expand/collapse button which, when selected, causes the processor to display or hide the answer while the individual query is continuously displayed in the respective display area.

9. The information processing apparatus according to claim 3, wherein the processor is configured to present, in each display area, (i) the individual query corresponding to the respective intention in a way that demonstrates which part of the question corresponds to the respective intention, (ii) the answer retrieved for the individual query, and (iii) an expand/collapse button which, when selected, causes the processor to display or hide the answer while the individual query is continuously displayed in the respective display area.

10. The information processing apparatus according to claim 4, wherein the processor is configured to present, in each display area, (i) the individual query corresponding to the respective intention in a way that demonstrates which part of the question corresponds to the respective intention, (ii) the answer retrieved for the individual query, and (iii) an expand/collapse button which, when selected, causes the processor to display or hide the answer while the individual query is continuously displayed in the respective display area.

11. The information processing apparatus according to claim 5, wherein the processor is configured to present, in each display area, (i) the individual query corresponding to the respective intention in a way that demonstrates which part of the question corresponds to the respective intention, (ii) the answer retrieved for the individual query, and (iii) an expand/collapse button which, when selected, causes the processor to display or hide the answer while the individual query is continuously displayed in the respective display area.

12. The information processing apparatus according to claim 6, wherein the processor is configured to present, in each display area, (i) the individual query corresponding to the respective intention in a way that demonstrates which part of the question corresponds to the respective intention, (ii) the answer retrieved for the individual query, and (iii) an expand/collapse button which, when selected, causes the processor to display or hide the answer while the individual query is continuously displayed in the respective display area.

13. The information processing apparatus according to claim 7, wherein the processor is configured to present the individual query corresponding to the respective intention and the answer in a way that demonstrates association between each part in the question corresponding to the respective intention and the respective display area where the answer is presented.

14. The information processing apparatus according to claim 8, wherein the processor is configured to present the individual query corresponding to the respective intention and the answer in a way that demonstrates association between each part in the question corresponding to the respective intention and the respective display area where the answer is presented.

15. The information processing apparatus according to claim 9, wherein the processor is configured to present the individual query corresponding to the respective intention and the answer in a way that demonstrates association between each part in the question corresponding to the respective intention and the respective display area where the answer is presented.

16. The information processing apparatus according to claim 10, wherein the processor is configured to present the individual query corresponding to the respective intention and the answer in a way that demonstrates association between each part in the question corresponding to the respective intention and the respective display area where the answer is presented.

17. The information processing apparatus according to claim 11, wherein the processor is configured to present the individual query corresponding to the respective intention and the answer in a way that demonstrates association between each part in the question corresponding to the respective intention and the respective display area where the answer is presented.

18. The information processing apparatus according to claim 12, wherein the processor is configured to present the individual query corresponding to the respective intention and the answer in a way that demonstrates association between each part in the question corresponding to the respective intention and the respective display area where the answer is presented.

19. An information processing method comprising:

parsing a question and, based on the parsing, specifying a number of one or more intentions included in the question, the number being a numerical integer value;

generating, from the question, one or more individual queries each corresponding to a respective one of the one or more intentions;

dividing a display region into a number of one or more display areas corresponding to the number of the one or more intentions; and presenting, in each display area, (i) the individual query corresponding to the respective intention and (ii) an answer retrieved for the individual query.

20. A non-transitory computer readable medium storing a program causing a computer to execute a process for information processing, the process comprising:

parsing a question and, based on the parsing, specifying a number of one or more intentions included in the question, the number being a numerical integer value;

generating, from the question, one or more individual queries each corresponding to a respective one of the one or more intentions;

dividing a display region into a number of one or more display areas corresponding to the number of the one or more intentions; and presenting, in each display area, (i) the individual query corresponding to the respective intention and (ii) an answer retrieved for the individual query.

\* \* \* \* \*